(12) United States Patent
Schilcher

(10) Patent No.: US 10,487,495 B2
(45) Date of Patent: Nov. 26, 2019

(54) COMPONENT AND PRODUCTION METHOD

(71) Applicant: Josef Schilcher, Rangersdorf (AT)

(72) Inventor: Josef Schilcher, Rangersdorf (AT)

( * ) Notice: Subject to any disclaimer, the term of this patent is extended or adjusted under 35 U.S.C. 154(b) by 0 days.

(21) Appl. No.: 15/778,646

(22) PCT Filed: Nov. 21, 2016

(86) PCT No.: PCT/EP2016/078337
§ 371 (c)(1),
(2) Date: May 24, 2018

(87) PCT Pub. No.: WO2017/089309
PCT Pub. Date: Jun. 1, 2017

(65) Prior Publication Data
US 2018/0355604 A1 Dec. 13, 2018

(30) Foreign Application Priority Data
Nov. 26, 2015 (AT) .................. GM348/2015

(51) Int. Cl.
*E04B 1/61* (2006.01)
*E04B 2/08* (2006.01)
(Continued)

(52) U.S. Cl.
CPC .............. *E04B 1/6162* (2013.01); *E04B 1/10* (2013.01); *E04B 1/61* (2013.01); *E04B 2/08* (2013.01);
(Continued)

(58) Field of Classification Search
CPC . E04B 1/6162; E04B 1/10; E04B 2/08; E04B 1/61; E04B 2002/0252; F16B 5/0088; F16B 5/0056
See application file for complete search history.

(56) References Cited

U.S. PATENT DOCUMENTS 299,381 A * 5/1884 Grove ................... E06B 3/9845
403/294
716,865 A * 12/1902 Choquet ................ E04B 2/18
52/578
(Continued)

FOREIGN PATENT DOCUMENTS

AT      505 737 B1    3/2010
AT      1 2597 U1    8/2012
(Continued)

OTHER PUBLICATIONS

International Search Report, dated Mar. 13, 2017, from corresponding PCT/EP2016/078337 application.
(Continued)

*Primary Examiner* — Rodney Mintz
(74) *Attorney, Agent, or Firm* — Young & Thompson

(57) ABSTRACT

A component having at least two parts which contact one another via their narrow faces, includes multiple connection elements which pretension the parts with respect to one another. The connection elements are accommodated in recesses formed as undercuts in the parts. The recesses are aligned transversely to the longitudinal extension of the narrow faces of the parts, the openings of the recesses being open towards the narrow faces of the parts. The connection elements are respectively formed of two wedge-shaped pieces arranged in a diametrically opposed manner. When the pieces of the connection elements are accommodated completely in the recesses, the ribs of the connection elements completely fill out the recesses, so that the parts are pretensioned with respect to one another, and a gap is prevented from forming between the parts or the closing of a previously present gap is achieved.

19 Claims, 4 Drawing Sheets

(51) Int. Cl.
  *E04B 1/10* (2006.01)
  *F16B 5/00* (2006.01)
  *E04B 2/02* (2006.01)

(52) U.S. Cl.
  CPC .......... *F16B 5/0056* (2013.01); *F16B 5/0088* (2013.01); *E04B 2002/0252* (2013.01)

(56) References Cited

U.S. PATENT DOCUMENTS

| | | | | |
|---|---|---|---|---|
| 1,018,987 | A * | 2/1912 | Philpot | E04F 15/04 296/41 |
| 1,045,691 | A * | 11/1912 | Fischer | F41H 5/04 109/85 |
| 1,723,306 | A * | 8/1929 | Sipe | E04B 1/615 211/182 |
| 1,913,290 | A * | 6/1933 | Rockwell | E04F 15/04 114/86 |
| 1,985,992 | A | 1/1935 | Hayman | |
| 2,363,405 | A * | 11/1944 | Eichelberger | E04B 1/10 403/409.1 |
| 2,392,551 | A * | 1/1946 | Roe | E04B 2/08 52/309.17 |
| 2,423,695 | A * | 7/1947 | Falco | E04C 2/06 52/223.7 |
| 3,641,730 | A * | 2/1972 | Meckstroth | E04B 1/6133 24/573.09 |
| 3,680,277 | A * | 8/1972 | Martin | E04B 1/6154 52/438 |
| 3,686,817 | A * | 8/1972 | Adams | E04B 1/6154 52/438 |
| 3,791,090 | A * | 2/1974 | Kniefel | E04B 2/08 446/127 |
| 8,147,162 | B1 * | 4/2012 | Burnett | F16B 5/0052 312/263 |
| 9,038,343 | B2 * | 5/2015 | Litaize | E04B 1/043 52/426 |
| 2004/0139680 | A1 * | 7/2004 | Hambright | E04B 2/06 52/578 |
| 2007/0240375 | A1 * | 10/2007 | Bennett | E04D 3/18 52/586.1 |
| 2009/0199497 | A1 * | 8/2009 | Wrightman | E04B 2/705 52/233 |
| 2009/0241460 | A1 * | 10/2009 | Beaulieu | E04B 1/6129 52/586.2 |
| 2013/0326984 | A1 * | 12/2013 | Litaize | E04B 1/043 52/426 |
| 2015/0259910 | A1 * | 9/2015 | Montiel Reyes | A63H 33/10 52/604 |
| 2016/0002913 | A1 | 1/2016 | Schilcher | |

FOREIGN PATENT DOCUMENTS

| | | |
|---|---|---|
| DE | 93 12 052 U1 | 10/1993 |
| EP | 0 886 016 A1 | 12/1998 |
| EP | 2 264 323 B1 | 8/2013 |
| FR | 1 518 263 A | 3/1968 |
| FR | 1 570 606 A | 6/1969 |
| WO | 2014/153574 A1 | 10/2014 |

OTHER PUBLICATIONS

AT Search Report, dated Jun. 21, 2016, from corresponding GM348/2015 application.

* cited by examiner

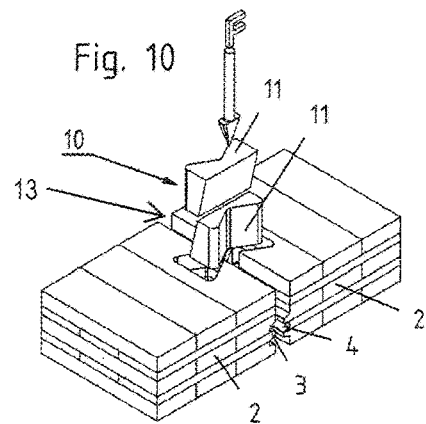
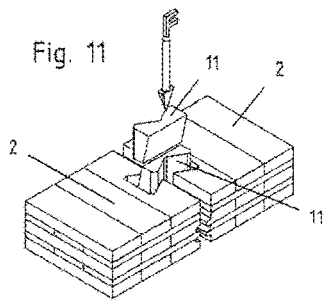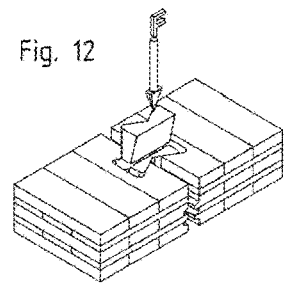
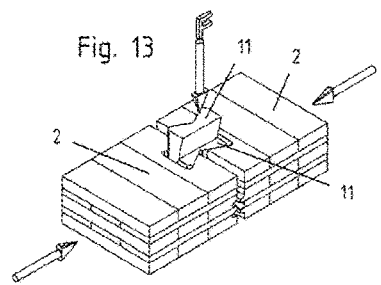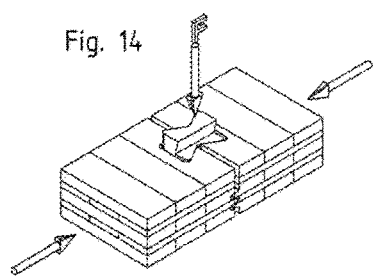
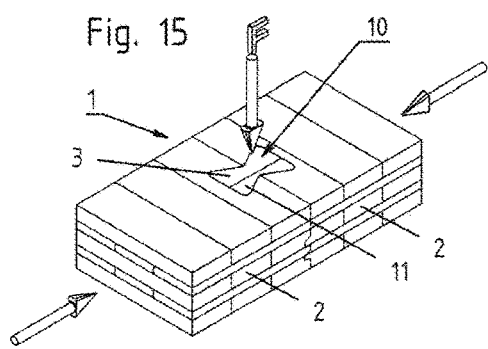

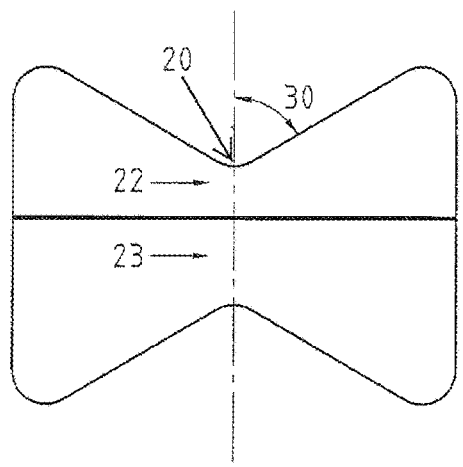
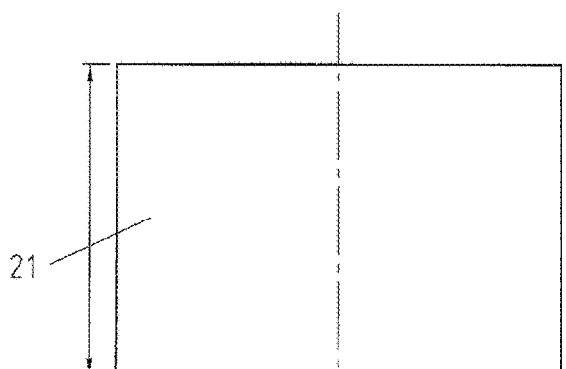
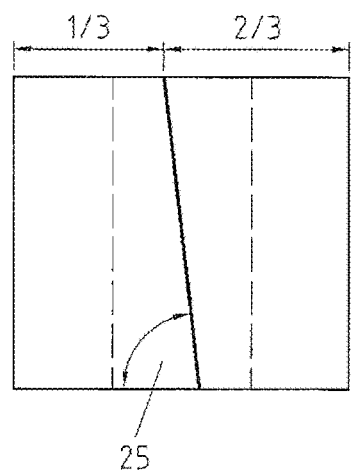

COMPONENT AND PRODUCTION METHOD

BACKGROUND OF THE INVENTION

Field of the Invention

The invention relates to a component comprising at least two pieces that adjoin one another over one of their surfaces and at least one connecting element that holds the pieces in their adjoining position.

The invention furthermore relates to a method for producing a component according to the invention.

Components of the initially-named type are known in various embodiments.

Description of the Related Art

Reference is made to FR 1,570,606 A, AT 12 597 U1, EP 2 264 323 B1 and U.S. Pat. No. 1,985,992 A. These documents disclose components in which the connecting means have two widening ribs that are opposite one another and that are inserted into longitudinally-running grooves that are made undercut in the adjoining narrow surfaces of the pieces.

Similar pieces are known from AT 505 737 B1 and WO 2014/153574 A1. In order to simplify the assembly and the tensioning of the pieces together to form the component, the connecting elements are divided into two parts that can be shifted along one wedge surface against one another in the longitudinal direction.

FR 1 518 263 A discloses a beam-shaped piece that consists of two profile rods that are connected to one another using two coupling rods. The coupling rods are made similarly to the connecting elements of WO 2014/153574 A1. The design of the profile rods, on the one hand, and the design of the coupling rods of FR 1 518 263 A, on the other hand, do not make it possible to move, for example, panel-shaped pieces onto one another during connection.

EP 0 886 016 A1 shows and describes a component of two panels that have been joined to one another. The joining takes place using a coupling rod that has a dovetailed cross-section. The one-piece, therefore not divided, coupling rod of EP 0 886 016 A1 also makes it possible to connect only already tightly adjoining panels to one another.

DE 93 12 052 U discloses a one-piece coupling rod for connection of panels that are to be joined to one another by beveling. The connection of panels that is known from DE 93 12 052 U has the same properties as the connection of EP 0 886 016 A1 and does not allow the panels to move onto one another when being connected. Rather, the panels must already be located adjoining one another when being connected.

Ceilings and similar components that consist of prefabricated pieces in the form of panel-shaped ceiling elements and that are generally only joined together at the construction site often have residual stresses and are not straight.

Often, the surfaces of the components that are to be connected to one another and that are to be abutted to one another have a curved or twisted shape.

The tensioning of these pieces together to form a gapless component is time-consuming and requires mechanical clamping devices. When the pieces are being tensioned together, they are screwed to one another with screws, generally woodworking thread screws, via a facing board that has been installed in a step fold.

This type of connection has the disadvantage that the pieces that are to be connected to one another can only be held in their uppermost region by the facing board using screws and the components can open to the inside by a gap being formed there again.

This is disadvantageous since wooden ceilings and other components are being increasingly used as decorative ceilings or decorative components in which gaps are perceived as disruptive.

BRIEF SUMMARY OF THE INVENTION

The object of the invention is to present a component that consists of pieces and in which gaps between the pieces are avoided and there is no risk of a gap forming between the adjoining pieces.

This object is achieved according to the invention with a component and with a method.

Preferred and advantageous configurations of the invention are the subject matter of the dependent claims.

Since, in the component according to the invention, the at least two pieces are connected to one another via connecting elements that are able to pretension the pieces onto one another, it is possible to connect the pieces to one another even if they are warped (curved or bent) and have residual stresses, such that the surfaces of the pieces facing one another tightly adjoin one another, therefore are without gaps, over the entire length of the component.

In particular, when the pieces of the component according to the invention are panel-shaped ceiling elements, the use of connecting elements according to the invention makes it possible to draw the ceiling elements, which first lie next to one another at a distance from one another, closer to one another to the extent that their narrow surfaces essentially adjoin one another without gaps. This is the case without separate clamping devices having to be used.

The connecting elements used according to the invention can be connecting elements that engage recesses that are made undercut in the surfaces of the pieces that face one another, the connecting elements having widening ribs that engage in the recesses.

Within the scope of the invention, it is preferred if the connecting elements, as is known in principle from WO 2014/153574 A1, consist of two parts that are wedge-shaped and are inserted mirror-inverted into the recesses.

The pieces that are preferably used within the scope of the invention are plane or elongated pieces, for example in the form of panels, boards or posts that adjoin one another via narrow surfaces. Here, in the narrow surfaces, there can be tongues and grooves that run lengthwise, outside tongues also being considered.

In one preferred embodiment of the components according to the invention, the recesses that have been made undercut in the pieces extend transversely (perpendicularly) to the surface extension of the pieces.

Preferably, the recesses made undercut are open toward the narrow surfaces of the pieces, via which they are to adjoin a bordering piece. In other words, this means that the recesses are aligned transversely (perpendicularly) to the longitudinal extension of the narrow surfaces of the pieces, via which they adjoin one another. The mouths of the recesses lie in the narrow surfaces of the pieces, which surfaces adjoin one another in the component.

Preferably, the connecting elements, even when they consist of two parts that are made wedge-shaped, have a length that corresponds essentially to the thickness of the pieces.

Within the scope of the invention, it is preferred that over the length of the narrow surfaces with which the pieces of the component adjoin one another, there are several connecting elements. In particular, it is considered here that the connecting elements are at identical distances from one another.

It is considered, for example, within the scope of the invention, that there is one connecting element at a time in the region of the ends of the narrow surfaces, via which the pieces of the component adjoin one another when the connecting elements are in their active position.

Due to the inventive design of the component, on the one hand, and of the method according to the invention, on the other hand, it is effectively possible to tension the pieces together and to permanently overcome a gap. This also applies if there are tongues and grooves in the narrow surfaces of the pieces, so that the pieces are aligned flush with one another.

In one embodiment of the invention, it can be provided that in at least one part of the connecting elements, there is anchoring on which a tool can be attached for pulling out the part. This facilitates the loosening of the connection of pieces. The anchoring can be made in the form of metal sleeves with a (woodworking) thread provided outside and a thread provided inside, into which a tool can be screwed. For example, the sleeves are so-called "RAMPA" sleeves.

BRIEF DESCRIPTION OF THE DRAWINGS

Other details and features of the invention will become apparent from the following description of one preferred embodiment based on the drawings.

FIGS. 10 to 15 show the sequence of steps when pieces are being joined to form a component, FIG. 16 shows a connecting element in a plan view, FIG. 17 shows in a view from underneath FIG. 16 the connecting element from FIG. 16, and FIG. 18 shows in a view from the left of FIG. 16 the connecting element from FIG. 16.

DETAILED DESCRIPTION OF THE PREFERRED EMBODIMENTS

Figure 1:
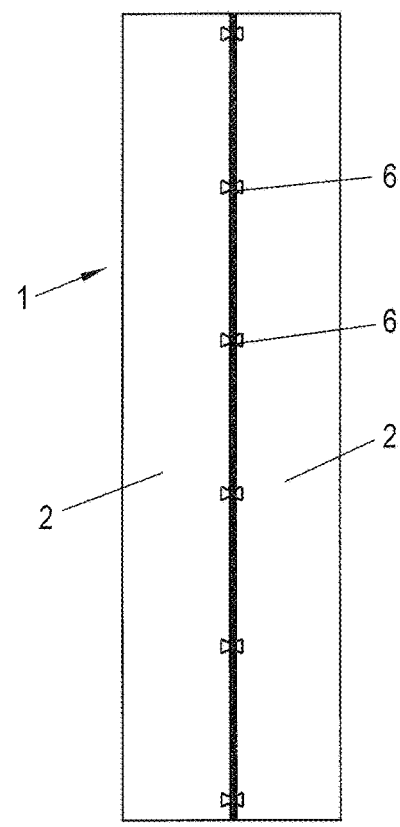
FIG. 1 shows two plane pieces of a component according to the invention that are located next to one another.
Figure 2:
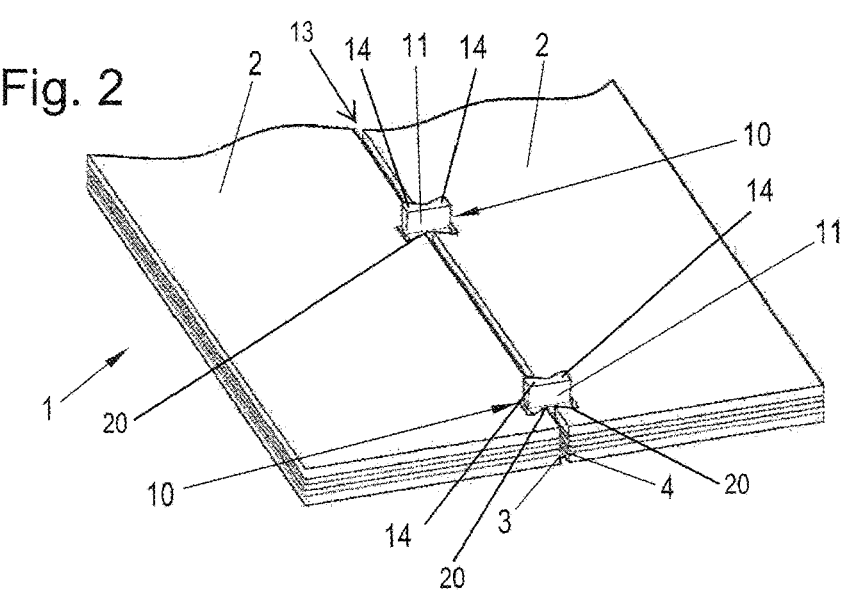
FIG. 2 shows in an oblique view one part of the component from FIG. 1 with connecting elements inserted.

A component 1 (not yet completed) that is shown schematically in FIG. 1 and that is, for example, a component for a ceiling comprises two pieces 2 (ceiling elements) that are facing one another via their narrow surfaces 5. In the narrow surfaces 5, in one piece 2 there is a groove 4 and in the other piece 2 there is a tongue 3 (FIG. 2). The tongue 3 can be a self-contained tongue or an outside tongue.

In the pieces 2 in the region of the narrow surfaces 5, there are recesses 6 that are made undercut; therefore, they each have a base 7 that is wider than the mouths of the recesses 6 that lie in the narrow surfaces 5 of the pieces 2.

Figure 3:
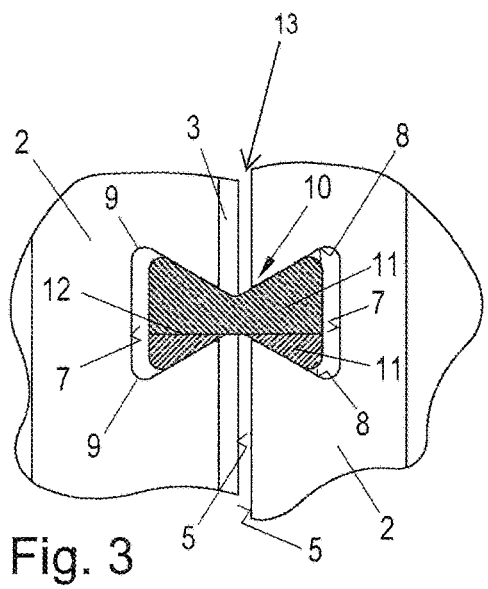
FIG. 3 shows one part of the component from FIG. 1 in a plan view with the connecting element inserted, but not yet in the active position.

In order to connect the pieces 2 to one another to form the component 1, connecting elements 10 are inserted into the recesses 6. Each of the connecting elements 10 consists of two wedge-shaped parts 11 that adjoin one another via their facing wedge surfaces 12. The wedge-shaped parts 11 of the connecting elements 10 are abutted such that the thicker end of one part 11 is assigned to the thinner end of the other part 11. The situation is shown in FIG. 3. In this state of the wedge-shaped parts 11 of the connecting elements 10, the parts 11 are arranged offset to one another. FIG. 2 also shows this in an oblique view.

The wedge-shaped parts 11 of the connecting elements 10 abutted to one another and inserted entirely into the recesses 6 yield an external shape of the connecting elements 10 that corresponds to the cross-sectional shape of the recesses 6 in the pieces 2 of the component 1. This is shown in FIG. 4, in which it is also shown that the connecting element 10 completely fills the recesses 6 into which it has been inserted.

Figure 4:
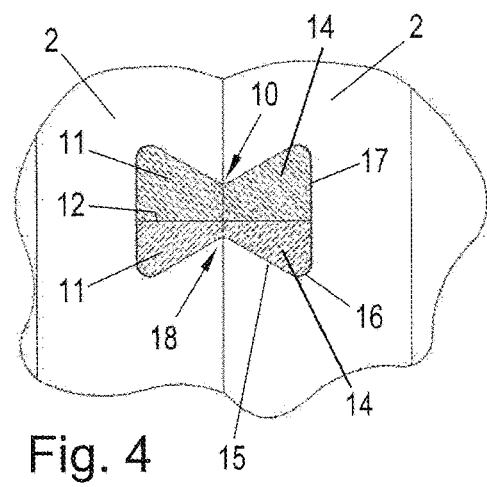
FIG. 4 shows the part of the component from FIG. 3 with the connecting element in the active position.

FIG. 4 also shows that after completely forcing in the wedge-shaped part 11 that first of all (FIG. 2) still projects over the large surface of the pieces 2, the pieces 2 are pretensioned onto one another and are held in a position in which their narrow surfaces 5 adjoin one another, and the tongue 3 on one piece 2 engages in the groove 4 in the other piece 2.

The depictions in FIGS. 1 to 4 show that the recesses 6 are aligned transversely to the large surfaces of the pieces 2. This means that the recesses 6 are open to the large surfaces of the pieces 2. Here, the recesses 6 are made such that their mouths that are made narrower than the base 7 lie in the narrow surfaces 5 of the pieces 2.

The recesses 6 have side surfaces 8 that pass via curves 9 into the base 7, and the ends of the side surfaces 8 that lie in the region of the mouth can also be made curved. The curves can be produced by milling.

FIG. 4 shows that the connecting elements 10, when they are in their active position that is shown in FIG. 4, entirely fill the recesses 6 in the pieces 2, i.e., have a cross-sectional shape and size that correspond to those of the recesses 6.

The connecting elements 10, which can also be called coupling strips, consist of, for example, plywood, the individual layers of the plywood lying parallel to the surface extension of the pieces 2.

The individual layers of the parts 11 of the connecting elements 10 are glued to one another and can also be secured against relative movements by wooden or metal pins.

Alternatively, the connecting elements 10 can be cut down from rods (of wood) that have been profiled according to the outer contour of the connecting elements 10 and can then be divided into the parts 11.

Figure 5:
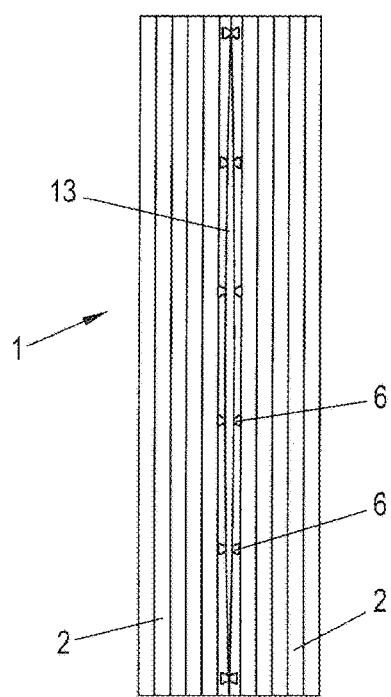
FIG. 5 shows pieces of a component that are curved and that are not yet connected to one another.

FIG. 5 shows two pieces 2 of one component 1, which have residual stress, i.e., are curved, so that their narrow surfaces 5 do not adjoin one another, and there is a gap 13.

Figure 7:
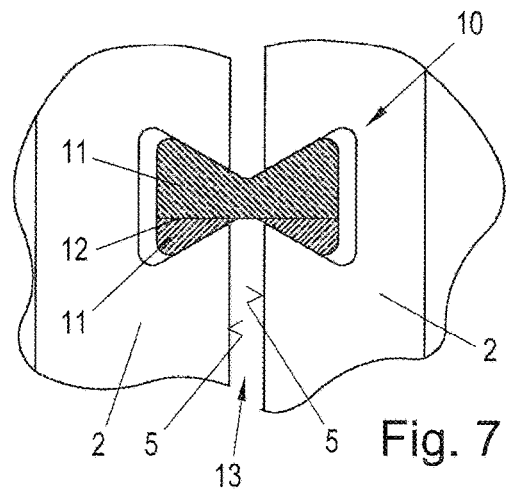
FIG. 7 shows in part the pieces of the component from FIG. 5 with the connecting element inserted, but not yet in the active position.
Figure 6:
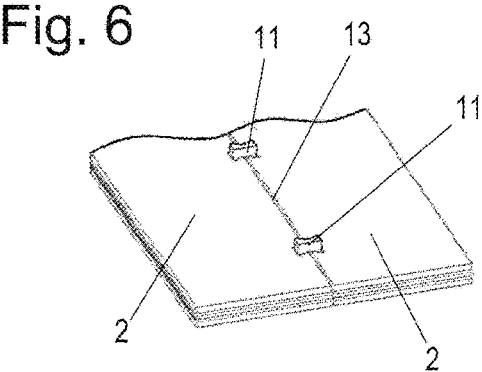
FIG. 6 shows a detail from FIG. 5 with the inserted connecting elements in an oblique view.

FIGS. 6 and 7 show how the parts 11 of the connecting elements 10 are inserted into the recesses 6 of the components 2, first a part 11 still projecting above the large surface of the pieces 2.

Figure 8:
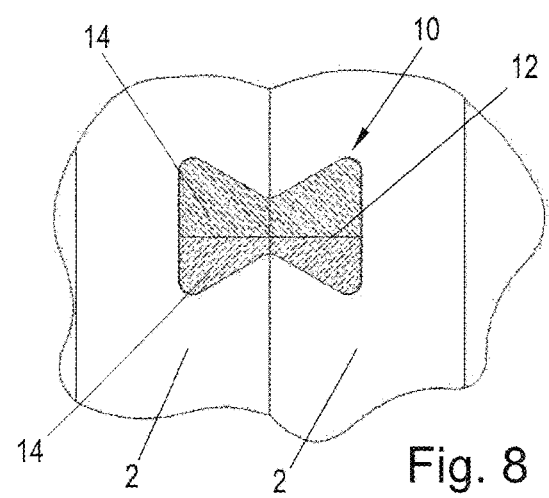
FIG. 8 shows the pieces of the component from FIG. 5 with the connecting element in the active position.
Figure 9:
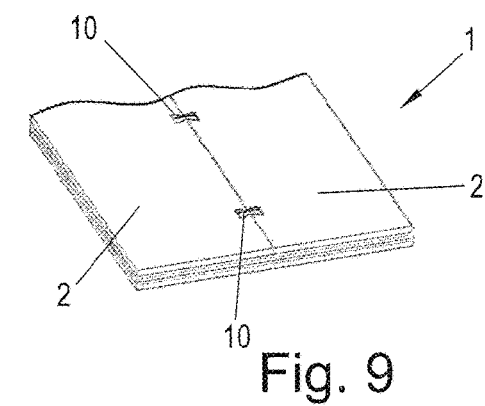
FIG. 9 shows one part of the component in a view that is similar to FIG. 6 with the connecting elements in the active position.

As soon as the two parts 11 are fully accommodated in the recesses 6, the two pieces 2 of the component 1 are drawn onto one another such that the curves of the pieces 2 are overcome and the gap 13 (FIGS. 5, 6 and 7) between the pieces 2 is closed, as is shown by FIGS. 8 and 9.

In particular, FIGS. 4 and 8 show that the connecting elements 10 have ribs 14 that widen away from one another and that are formed by the parts 11 of the connecting elements 10.

The ribs 14 have side surfaces 15 that pass via curved regions 16 into the end surface 17 of the ribs 14.

FIGS. 4 and 8 also show that the side surfaces 15 of the ribs 14 of the connecting elements 10 in the middle region ("wedge waist 20") of the connecting elements 10 pass into one another via curved regions 18.

In one possible embodiment of the component 1 according to the invention, the latter can be made as described below.

The wedge shape of the two parts 11 of the connecting elements 10 is chosen such that enough space remains for the insertion of the second part 11 of the connecting elements 10 when the two pieces 2 that are, for example, ceiling elements are arranged at a distance (gap 13) from one another (for example due to the protruding tongue 3) and the first wedge-shaped part 11 has already been inserted into a recess 6 of the pieces 2 (ceiling elements). The first part 11 is inserted such that its thinner end points up, and the wedge surface 12 is aligned such that the second part 11 with its thinner end forward can be inserted into the recesses 6 of the pieces 2 (ceiling elements). By pressing or driving in the second part 11, the pieces 2 (ceiling elements) are moved onto one another and pretensioned onto one another.

The recesses 6 have side surfaces 8 that pass via curves 9 into the base of the recesses 6, and the ends of the side surfaces 8 that lie in the region of the mouth of the recesses 6 can also be made curved. The curves 9 can be produced by milling.

The wedge shape and the definition of the parts 11 of the connecting elements 10 determine how large the gap 13 can be between the pieces 2 that lie next to one another and with what force the pieces 2 (ceiling elements) are pressed onto one another while the second part 11 of the connecting elements 10 is being forced in.

Good results are achieved when the thicknesses of the parts 11 of the connecting elements 10 in the region of the wedge waist 20 (the latter lies in the region of the mouths of the recesses 6) assume the ratio of 3:1. In other words, it is preferred if the thicker end of one part 11 in the region of the mouth of the recesses 6 is three times as thick as the thinner end of the other part 11, as is shown in, for example, FIGS. 16 to 18.

In other words, the thickness on the thinner end of the parts 11 is one-fourth and the thickness on the thicker end of the parts 11 is three-fourths of the thickness of the entire wedge waist 20.

Deviations of the indicated ratio of thicknesses of the parts 11 are possible (+/−15% or ¹¹⁄₁₆ to ¹³⁄₁₆ of the wedge waist 20 for the thicker end, as well as ³⁄₁₆ to ⁵⁄₁₆ of the wedge waist 20 for the thinner end).

It is advantageous if based on the ratio of 3:1 in the region of the wedge waist 20 and a wedge height 21 (length of the connecting element 10, compare FIG. 17), a wedge angle 25 (FIG. 18), therefore the angle that the wedge surfaces 12 include with the end surfaces of the connecting elements 10, arises in the range from 85 to 72°, the range from 81 to 77° being preferred.

The wedge height 21, therefore the length of the connecting elements 10, is, for example, 40 to 400 mm (1.5748-15.748 inches), and the thickness of the pieces 2 of the component 1 can be up to 500 mm (19.685 inches).

The angle that the side surfaces 8 of the recesses 6 made undercut include with one another determines the maximum distance (gap 13) that is allowable when the pieces 2 (ceiling elements) are being connected to form one piece 1 and the size of the forces acting on the pieces 2 (ceiling elements) and loading the latter onto one another when the second part 11 of the connecting elements 10 is being forced in. With reference to the connecting elements 10, this angle corresponds to the size of the increase of the thickness of the ribs 14, therefore to the definition of the dovetail shape of the ribs 14 of the parts 11 of the connecting elements 10 (symbolized by the angle 30 in FIG. 16).

The definition of the dovetail shape of the ribs 14 of the connecting elements 10 that is determined by the angle 30 (FIG. 16) should be chosen with consideration of the respectively given ratios. An overly small or an overly large angle between the side surfaces 8 of the recesses 6 in certain cases has a disadvantageous effect on the maximum possible distance (gap 13) between the pieces 2 and the forces acting on the pieces 2. The ratios are good when the angle that the side surfaces 8 of the recesses 6 and the side surfaces of the ribs 14 of the connecting elements 10 included with one another is roughly 50 to 70°, preferably 60°.

With reference to the attached FIGS. 10 to 15, it is described by way of example how a component 1 according to the invention, which encompasses at least two pieces 2, can be produced by the pieces 2 being connected to one another, a component 1 according to the invention being produced from ceiling elements as pieces 2.

FIG. 10 shows how pieces 2 in the form of two ceiling elements are arranged next to one another at a distance (gap 13) from one another, on the narrow surface 5 of one piece 2 (ceiling element) there being a rib 3 and in the narrow surface 5 of the other piece 2 there being a groove 4. It is apparent from the sequence of representations of FIGS. 11 and 12 that first of all one part 11 of the connecting elements 10 is inserted into the recesses 6 of the pieces 2 (ceiling elements). As soon as the situation of FIG. 12 has been achieved, the second part 11 of the connecting element 10 is also pushed into the recesses 6 (FIG. 13), this part 11 being pushed with its thinner end forward into the recesses 6 of the pieces 2 and being forced in in the direction of the arrow F. This is possible because the first part 11 of the connecting element 10 has been inserted such that its thinner end points up, so that enough space remains for the insertion of the second part 11 of the connecting element 10 with its thinner end forward. By increasingly forcing in the second part 11 of the connecting element 10 (FIGS. 13 and 14), the pieces 2 (ceiling elements) are drawn closer to one another until they finally are connected to one another seamlessly to form the component 1, as is apparent from FIG. 15.

This type of connection of ceiling elements is advantageous compared to the state of the art because the clamping devices (so-called panel tensions) that are to be attached to the ceiling elements and that have been used to date for drawing the (horizontal) ceiling elements together are unnecessary.

In summary, one embodiment of the component 1 according to the invention can be described as follows:

A component 1 that consists of at least two pieces 2 that adjoin one another via their narrow surfaces 5 comprises several connecting elements 10 that pretension the pieces 2 of the component 1 onto one another. The connecting elements 10 are accommodated in recesses 6 of the pieces 2, which recesses are made undercut. The recesses 6 in the pieces 2 are aligned transversely to the longitudinal extension of the narrow surfaces 5 of the pieces 2, the mouths of the recesses 6 being open to the narrow surfaces 5 of the pieces 2. Each connecting element 10 consists of two wedge-shaped parts 11 that are arranged mirror-inverted. When the parts 11 of the connecting elements 10 are fully accommodated in the recesses 6, the ribs 14 of the connecting elements 10 completely fill the recesses 6 in the pieces 2, so that the pieces 2 are pretensioned onto one another, and the formation of a gap 13 between the pieces 2 is prevented or the closing of a preexisting gap 13 is achieved.

The invention claimed is:

1. A component, comprising:
    at least two component parts that abut one another along mutually-facing surfaces facing one another; and
    at least one connecting element,
    wherein the at least two component parts each have at least one recess formed as an undercut and having side surfaces and provided an opening that is open towards the mutually-facing surfaces of the at least two component parts,
    wherein the openings of the component parts lie in the mutually-facing surfaces of the component parts abutting one another in the component,
    wherein the recesses are aligned transversely to a surface extension of the component parts, the recesses being narrower in a region of the openings than in a region of a base that is located away from the opening,
    wherein the at least one connecting element has ribs, which have a same cross-sectional shape as the recesses in the component parts, the at least one connecting element consisting of two wedge-shaped parts with wedge surfaces, the wedge-shaped parts being laid against one another to entirely fill the at least one recess, the wedge surfaces of the at least one connecting element being aligned transversely to the mutually-facing surfaces of the component parts, a plurality of said connecting elements being provided over a length of the mutually-facing surfaces with which the component parts of the component abut one another, and
    wherein the at least one connecting element, which consists of the two wedge-shaped parts, has a length which corresponds substantially to a thickness of the component parts.

2. The component according to claim 1, wherein the side surfaces converge in the region of the openings of the recesses via curvatures into the mutually-facing surfaces of the at least two component parts.

3. The component according to claim 1, wherein the recesses are formed trapezoidally undercut.

4. The component according to claim 1, wherein the side surfaces of the recesses enclose an angle of 50 to 70°.

5. The component according to claim 1, wherein the at least one connecting element consists of glued plywood layers, lightweight metal, injection material, plastic, or a composite material.

6. The component according to claim 1, wherein the at least one connecting element is secured against movements relative to the component parts by wooden or metal pins.

7. The component according to claim 1, wherein the wedge surfaces of the at least one connecting element are aligned substantially transversely to the mutually-facing surfaces of the component parts.

8. The component according to claim 1, wherein the wedge surfaces of the at least one connecting element have an angle of 72 to 85° to a plane of the component parts.

9. The component according to claim 1, wherein a ratio of thicknesses of the wedge-shaped parts of the at least one connecting element in the region of the opening is substantially 3:1.

10. The component according to claim 1, wherein the thickness of the component parts is up to 500 mm (19.685 inches).

11. The component according to claim 1, wherein the side surfaces of the recesses enclose an angle of 60°.

12. The component according to claim 1, wherein the wedge surfaces of the connecting element have an angle of 77 to 81° to a plane of the component parts.

13. The component according to claim 1, wherein the at least one connecting element has ribs that have the same cross-sectional shape as the recesses in the at least two component parts.

14. The component according to claim 13, wherein the base of the respective recess converges via curvatures into the side surfaces of the recess.

15. The component according to claim 13, wherein the side surfaces converge in the region of the openings of the recesses via curvatures into the mutually-facing surfaces of the at least two component parts.

16. The component according to claim 1, wherein the base of the respective recess converges via curvatures into the side surfaces of the recess.

17. The component according to claim 16, wherein the curvatures are round milling cuts.

18. The component according to claim 16, wherein the side surfaces converge in the region of the openings of the recesses via curvatures into the mutually-facing surfaces of the at least two component parts.

19. A method of producing the component of claim 1 the at least two component parts disposed next to one another with narrow surfaces facing one another and at a distance from one another, the method comprising:
    introducing a first one of the wedge-shaped parts of the at least one connecting element with a thicker end thereof first into the recesses of the component parts that are disposed next to one another; and
    introducing a second one of the wedge-shaped parts of the at least one connecting element with a thinner end thereof first into the recesses and is pressed into the recesses until the narrow surfaces of the component parts abut one another without a gap, the wedge-shaped parts of the at least one connecting element being completely accommodated in the recesses and the ribs of the wedge-shaped parts completely filling the recesses.

* * * * *